United States Patent Office 2,977,518
Patented Mar. 28, 1961

2,977,518

ELECTRIC POWER TRANSLATING APPARATUS FOR SPEED CONTROL OF ALTERNATING CURRENT MOTORS

Wilhelm Kafka, Tennenlohe, near Erlangen, and Georg Sichling and Manfred Tschermak, Erlangen, Germany, assignors to Siemens-Schuckertwerke Aktiengesellschaft, Berlin-Siemensstadt, Germany, a corporation of Germany Original application Apr. 5, 1955, Ser. No. 499,416. Divided and this application Oct. 11, 1956, Ser. No. 615,301

Claims priority, application Germany Apr. 7, 1954

6 Claims. (Cl. 318—138)

In applicants' copending application, Serial No. 499,416, filed April 5, 1955, now Patent No. 2,824,241, granted February 18, 1958, and titled Electric Power Translating Apparatus of Low Losses and Low Wattless Power, there is described apparatus for translating alternating currents and voltages for power distribution with minimum losses and minimum wattless power.

The present invention is a division of the above-mentioned application and is directed particularly to the translation of alternating voltage into another alternating voltage of controllable frequency for operating variable-speed motors of the wound-rotor and synchronous types.

Translating operations of this kind, in general, are desired to incur only moderate wattage losses and to avoid placing an appreciable wattless power demand upon the feeder line. This can be achieved with the aid of dynamoelectric machines; but for many applications such rotating machines are undesired. Certain translating operations, in principle, are also possible with magnetic amplifiers or gaseous discharge devices, although magnetic amplifiers are applicable for currents and voltages of only one direction unless appreciable additional losses are to be permitted. In any event, magnetic amplifiers and gaseous tubes when used in alternating-current systems for voltage or power regulation, such as by the delayed commutation method, impose a relatively large wattless load upon the alternating-current feeder line.

It is, therefore, a more specific object of our invention to provide power translating apparatus for A.-C. motor control which is capable by means of static devices to translate power-current voltages of any kind and any wave shape at low wattage losses and with a more favorable power factor than heretofore attained with static translating means.

To this end, and in accordance with a feature of our invention, we connect into the circuit of the input voltage one or more rapidly acting switching members and, by means of these members, chop the input voltage at the rhythm of a fixed or changing control frequency into individual voltage sections; and we adjust the ratio of the make and break intervals of the switching members so as to control the median values of the individual voltage section in accordance with the desired time curve of the output voltage. Preferably, we further provide filter means for suppressing the upper harmonics resulting from the chopping operation.

According to a more specific feature of our invention, the above-mentioned switching members consist of semiconductor devices of controllable resistance and are controlled to abruptly vary their resistance between minimum and maximum limits in synchronism with the control frequency.

According to still another feature of the invention, the voltage-chopping switching members of the translating system consist of magnetically responsive semiconductor devices equipped with a magnet structure in whose field the semiconductor member is disposed and which has field windings for controlling the strength and/or polarity of that field.

Although in communication engineering the chopping principle has been employed for modulating purposes, for instance to minimize interference in message transmission, the invention is based upon the recognition that, by virtue of the means herein disclosed, a chopping method is also applicable for supplying electric power to motors in distribution systems of utilities, with the advantage of not only reducing power losses, but also the wattless load imposed upon the feeder line.

The variation in ratio of make and break intervals, corresponding to the median value of the motor-energizing voltage to be formed, can be effected by varying the width (i.e. duration) of the voltage sections and/or by varying the chopping frequency. For instance, when chopping a direct voltage at a given constant frequency, the width of the resulting voltage sections can be changed periodically from zero to a maximum and thereafter back to zero. This results in translating the input voltage into median value corresponding to the half-wave of an alternating current. When thereafter the direct voltage is reversed in polarity and the method is repeated, a second alternating-current half-wave of reversed direction is obtained. It will be recognized, therefore, that the method is suitable for driving an alternating-current motor from a source of direct voltage.

If the chopping device used were ideal so that it had no interior resistance thus completely interrupting its circuit within infinitesimal time, then the chopping operation would not involve any wattage losses at all. The subsequent formation of a median voltage value would require smoothing by reactive components, such as capacitances or inductances, which involve a wattless load; but such filtering means become smaller with a higher chopping frequency.

The switching devices now available fall short of providing the just-mentioned ideal chopping operation. Although mechanical chopping devices interrupt the circuit completely and have no appreciable residual resistance when the mechanical contact is closed, such contacts are subjected to considerable wear so that their useful life is rather limited. Besides, mechanical interrupters are not suitable for higher frequencies. For both reasons such interrupters are not applicable for attaining the objects of the present invention. Gaseous tubes are not applicable because they are incapable of interrupting the plate current other than by natural extinction of the instantaneous current itself. In principle, high-vacuum tubes are applicable, but they are mechanically sensitive and when conducting have a residual resistance so high as to cause several percent of voltage drop. In contrast, the above-mentioned semiconductor devices are particularly well suitable for the chopping method according to the invention. They are controllable sufficiently abruptly to change their resistance from maximum to minimum, and vice versa, the ratio between maximum and minimum resistance being very high.

Among the just-mentioned semiconductors and particularly suitable for the purposes of the invention are the symmetrically conducting and magnetically controllable semiconductors of high character mobility, that is semiconductors whose carrier mobility is about 600 cm.$^2$/volt sec. or more, and also asymmetrically conducting semiconductors of the magnetic barrier type.

The suitable semiconductors of high carrier mobility comprise those of the type $A_{III}B_V$, that is compounds of any one of the elements boron, aluminum, gallium, indium in the third group (subgroup B) of the periodic system with any one of the elements nitrogen, phosphorus, arsenic, antimony in the fifth periodic group (subgroup B). Semiconductors of this type, having greatly increased resistance when subjected to a magnetic field, are described in the copending applications Serial No. 275,785, filed March 10, 1952, now Patent 2,798,989; and Serial No. 391,647, filed November 12, 1953, both assigned to the assignee of the present invention.

Semiconductors of the magnetic barrier type, of which intrinsically conducting and surface-treated germanium is preferably applicable, are likewise distinct by a relatively low electric resistance which, by applying a magnetic field of a given direction and of sufficient strength, can be increased to a very high value in a given direction of curent conductance. The high asymmetrical resistance of these semiconductors can be wholly or partially eliminated by an additionally applied electric field or by radiation of a given direction. Semiconducting resistors exhibiting the magnetic barrier-layer effect are described in the copending applications Serial No. 297,788, filed July 8, 1952, now Patent 2,736,858; Serial No. 462,516, filed October 15, 1954; and Serial No. 495,007, filed March 17, 1955, all assigned to the assignee of the present invention.

Other types of controllable semiconducting resistors, for instance transistors, preferably of the junction-type, and other very rapidly operating switching members of similar switching properties are suitable for the invention provided they are capable of chopping a voltage without appreciable losses at the required frequency.

The foregoing and more specific objects, advantages and features of the invention will be apparent from and will be set forth in, the following description with reference to the embodiments of the invention illustrated on the drawing in which:

Figs. 4a and 4b show coordinate diagrams of voltage curves relating to a translating operation for controlling the amplitude of an alternating voltage.

Fig. 15a is the circuit diagram of a system for translating alternating current of constant frequency and constant voltage into alternating current of variable frequency and variable voltage, Fig. 15b shows a modified detail and Fig. 15c an explanatory voltage and current diagram.

Consider first the case of converting a direct voltage with minimum losses into a direct voltage of lower magnitude. Figs. 1a to 1d exemplify two possibilities of such conversion. The feeder voltage $U_1$ is periodically chopped into individual voltage sections of the duration $T_e$, with intermediate pauses or break intervals $T_a$.

Figures 1A, 1B, 1C, 1D, 2, 2A, 2B, 3:
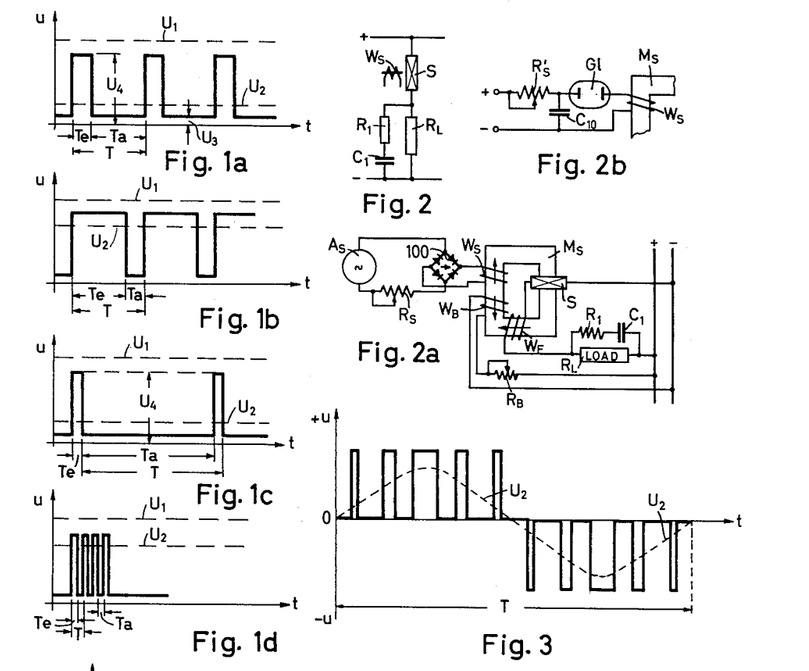
Figs. 1a to 1d show voltage characteristics explanatory of apparatus for translating high direct voltage into low direct voltage.
Fig. 2 shows schematically the circuit diagram of the simplest form of such translating apparatus.
Fig. 2a shows schematically the circuit diagram of another such translating apparatus.
Fig. 2b shows a modified portion of an otherwise similar apparatus.
Fig. 3 is a schematic voltage-time diagram exemplifying the translation of direct current into alternating current.

The chopping operation can be effected by means of an apparatus according to Figs. 2a or 2b. In Fig. 2a the load resistor $R_L$ is connected to the plus and minus buses of a direct-current line supplying the voltage $U_1$. A magnetically controllable semiconductor member S is connected in series with the load $R_L$ and is controlled by a winding $W_S$ so that its resistance is a minimum during the make interval $T_e$ and a maximum during the break interval $T_a$. Accordingly, during the interval $T_e$ the voltage $U_4$ is impressed upon the load resistor, while during the interval $T_a$ the lower load voltage $U_3$ is effective. These voltage sections can be smoothed to a medium value $U_2$ by means of filtering devices, for instance by the series connection of a damping resistor $R_1$ and a capacitor $C_1$ connected parallel to the load resistor $R_L$ as shown. By varying the ratio of make interval $T_e$ to break interval $T_a$, the median value of the converted voltage can be changed at will continuously between the limits $U_4$ and $U_3$, as will be recognized from Fig. 1a in comparison with Fig. 1b. However, one of the intervals, for instance the make interval $T_e$, may remain constant and the break interval $T_a$ may be varied so that the duration of the period T changes, as is represented by Figs. 1c and 1d. In apparatus according to Fig. 2 the smoothing components may be omitted in certain cases, particularly when the load $R_L$ has inherent inertia, as is the case with incandescent lamps, furnaces, motors and the like.

In order to obtain the above-described control performance of Figs. 1a and 1b, the translating apparatus of Fig. 2a is designed as follows. The magnetically responsive semiconductor member S is located in the field of a magnet structure $M_S$ excited by a bias field winding $W_B$ which is energized from the direct-current feeder line through a rheostat $R_B$ to produce an adjusted constant magnetomotive force in the system $M_S$. The control winding $W_S$ is inductively linked with the magnet structure $M_S$ and is energized through a rectifier $G_S$ from a suitable source of alternating voltage of the desired control frequency. This source is represented by an alternator $A_S$. The amplitude of the pulsating control voltage is adjusted or varied by means of a rheostat $R_S$. The load circuit is shown to include in series a feedback winding $W_F$ on the magnetostructure $M_S$. The feedback winding $W_F$ coacts with windings $W_S$ and $W_B$ to produce a flip-flop characteristic of the semiconductor resistance as is described in applicants' above-mentioned copending application Serial No. 499,416. The component magnetomotive force of winding $W_B$ normally produces in semiconductor members a magnetic field perpendicular to the direction of the load current axis so as to reduce the resistance to a minimum. Only during one half-wave period of the pulsating control current in winding $W_S$ can this winding act in differential relation to the bias field winding $W_B$ so that at a given phase point the magnetic field strength in member S declines below a critical value at which the resistance of the semiconductor is triggered up to its maximum value, thus causing the device to "break" the load circuit. At some time thereafter, the magnetomotive force of winding $W_B$ again becomes preponderant so that the resultant field strength exceeds another critical value at which the resistance is triggered down to the minimum value thus "making" the load circuit. The phase moments at which the break and make operations occur are set or controlled by means of the rheostats $R_S$ and $R_B$.

If the control winding is energized according to the modification shown in Fig. 2b, the apparatus is suitable for operation according to Figs. 1c and 1d. The control winding $W_S$ in Fig. 2 is excited by an RC tank circuit through a glow tube G1. By varying the setting of the control rheostat $R_S$, the break period $T_a$ can be varied, while the make period $T_c$, being determined by the ignition and extinction voltage of the glow tube G1, remains constant. Otherwise the apparatus is as shown in Fig. 2a.

In this apparatus as well as in those described below, the switching member may be formed of a symmetrically conducting semiconductor of high carrier mobility, preferably a crystalline body of a binary $A_{III}B_V$-type compound such as indium arsenide or indium antimonide, both affording a carrier mobility above 20,000 cm.$^2$/volt second. However, in the apparatus of Fig. 2, as well as in those described below, the switching member may also be formed by a semiconductor of the magnetic barrier type, it being then necessary of course to observe the proper polarities of the voltages and the electromotive forces of the resistance controlling field windings of the semiconductor device. When thus providing a semiconductor of the magnetic barrier type, its semiconducting substance may have a lower carrier mobility and consists preferably of germanium, although the above-mentioned indium compounds, as well as other semiconducting materials, including those previously mentioned in this specification, are also applicable. For securing the magnetically controllable valve or rectifying effect, the semiconductor member is so prepared as to have a surface of high surface recombination opposed to a surface or portion of low surface recombination. This is done either by applying a surface treatment (see the above-mentioned copending application Serial No. 297,788) and/or by giving the semiconductor body a particular shape as disclosed in the above-mentioned copending application Serial No. 495,007. For instance, relating to Fig. 2a, the following design is applicable.

One of the vertical surfaces of the semconductor crystal extending parallel to the current-flow direction is given high surface recombination by grinding and polishing that surface to mirror finish. The other vertical surface parallel to the current flow is given low surface recombination by etching. This is done, for instance, by anodically treating the surface in an electrolytic bath. Suitable as such a bath in the case of germanium is diluted caustic soda with some addition of hydrogen peroxide.

In such a semiconductor member, the electron-hole pairs become crowded near the surface of high recombination so that a carrier-depleted zone, i.e., the magnetic barrier layer, is formed in the zone of low recombination. This effect has the result that the semiconductor has high resistance to current flow in one direction and low resistance in the other direction, depending upon the polarity of the applied magnetic field. Hence, the rectifying action can be reversed by reversing the magnetic field polarity. This barrier effect is increased by giving the high-recombination surface a larger area than the low-recombination surface or reducing the latter surface to zero as described in the above-mentioned application Serial No. 495,007; but this need not herein be further described because the particular design of the magnetic-barrier device is not essential to the present invention proper.

The semiconductor member is dimensioned in accordance with the required resistance and power values. For controlling high power values, it may be necessary to subdivide the member into a number of individual crystal or/and to provide them with cooling fins or other cooling means. The individual crystals are interconnected in series or parallel depending upon the load requirements.

Another important application of the invention is for the conversion of direct current into alternating current. Such a conversion can be obtained in accordance with the method exemplified by Fig. 3. During each half-wave to be formed, the feeder voltage is interrupted or chopped several times and the ratio of make and break intervals is so varied during the half-wave period that the corresponding median voltage value $U_2$ corresponds to a sinusoidal half-wave, a reversal of polarity being required after each half-wave.

Figure 4B:
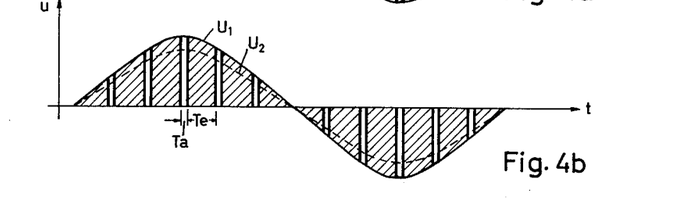

Another important application of the invention is for the conversion of alternating current into alternating current of different voltage or different frequency. For instance, according to Figs. 4a and 4b, the effective or median valued during each half-wave of an alternating current or alternating voltage is controlled by repetitively chopping the current or voltage during each half-wave without changing the feeder frequency. Fig. 4a shows the adjustment of a low median value $U_2$ of the voltage derived from a feeder voltage $U_1$ through the rapidly acting members. For comparison, Fig. 4b shows a control condition in which a relatively high median voltage value $U_2$ is obtained. The two control conditions differ in that the ratio of make to break intervals is relatively small in Fig. 4a but relatively large in Fig. 4b. The chopping frequency is the same in both cases. For obtaining the median value $U_2$ it is preferable to smoothen the upper harmonics of the high control frequency at the load resistor. The circuit connection may correspond to Fig. 2, except that the apparatus is energized by alternating voltage instead of direct voltage. This fundamental and simple circuit connection requires that the switching member S be conductive in both directions of current flow, a requirement readily satisfiable with semiconducting resistance members. It will be recognized that a converting apparatus operating according to Figs. 4a and 4b functions much like a continuously regulatable transformer.

Figure 5:
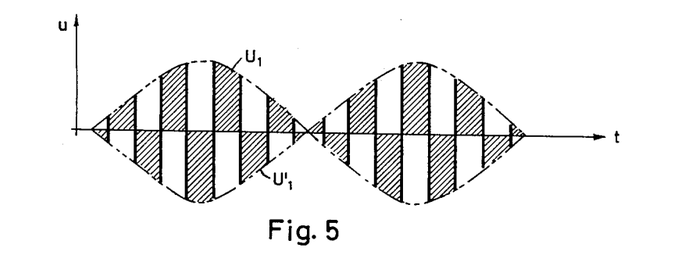
Figs. 5 and 6 are further voltage diagrams relating to a method for changing the frequency of alternating voltage.
Figure 6:
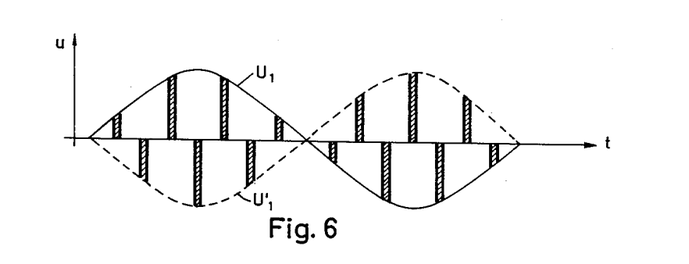

By reversing the polarity of the voltage sections during each second half-wave, a direct current of controllable median value can be obtained. However, an alternating current can also be converted by chopping into an alternating current of a higher frequency which is modulated by the alternating input current. This method is illustrated in Figs. 5 and 6. According to Fig. 5 the half-waves of the input current are chopped into individual sections, and these sections are alternately reversed in polarity relative to the load. The sine wave of the input voltage is shown at $U_1$. The polarity-reversed sine wave is shown at $U'_1$. In this way a new, modulated alternating voltage of higher frequency is produced, this voltage being indicated by hatched areas.

Fig. 6 also exhibits how, additionally, the voltage of the higher frequency can be controlled by reducing the width of the individual voltage sections relative to the values shown in Fig. 5, thus producing a correspondingly smaller median value for the individual sections. If the width of the voltage sections remains constant but their time spacing is changed, then a change in frequency is obtained aside from the change in voltage magnitude. The polarity reversal may also be effected after the elapse of several voltage sections. In all cases in which the input voltage is alternating, the translated voltage may be smoothed by resonance circuits tuned to the output frequency.

According to the present invention a translating operation as described above serves to produce alternating current of variable frequency and, if desired, also of variable voltage, particularly for producing multi-phase current from direct current, alternating current or three-phase current, for the purpose of producing a rotating magnetic field of variable speed of rotation. With the aid of such a controllable rotating field, motors of simplest design can be used for controlling or regulating a drive. As a result, a machine without commutator becomes suitable for purposes which heretofore required the use of a Leonard converter with two commutators or a three-phase commutator machine. This makes it possible to employ the most rugged type of electric motor for operating under such unfavorable conditions as in a dust-laden atmosphere or excessive heat, and to place the appertaining control device at any desired remote location. Such systems provide a three-phase voltage of variable frequency, phase rotation and voltage magnitude, and permit the operation of simple induction motors at controllable speed, with controllable brake performance and reversible running direction. They can also be adjusted to a desired torque at standstill. When providing the system with synchronous motors, several such motors can be started and operated in exact synchronism, as is required for certain follow-up control systems now being operated with rotating frequency-converters. For the regulation of induction motors and other rotating-field motors, the motor voltage must be changeable from a minimum value at zero frequency up to a maximum value at the highest frequency in approximately linear proportion to the frequency. The frequency can be controlled either independently of the motor or in dependence upon motor speed, motor torque, or any other variable condition such as the speed of a second motor. That is, the revolving speed is then varied by controlling the resistance of the switching members in response to the particular variable condition to be regulated.

The production of rotating fields of controllable speed and reversible direction may be effected in various ways. Most readily understandable is an apparatus which includes an intermediate direct-current circuit or derives its energization from a direct-current feeder circuit.

Figure 7:
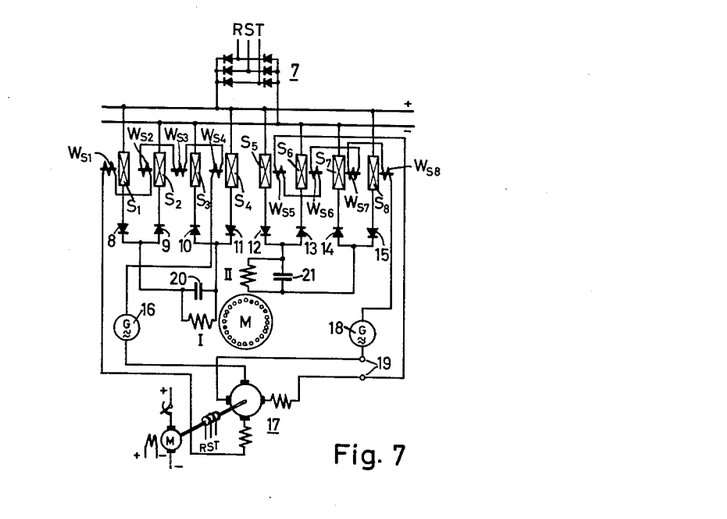
Fig. 7 shows the schematic circuit diagram of a system for controlling the speed of an induction motor by changing the frequency of an alternating current supplied from a three-phase feeder line of fixed frequency.

The motor control system of Fig. 7 exemplifies a motor-speed control system equipped with an intermediate direct-current circuit. The system serves to operate a two-phase induction motor M with a squirrel cage armature from a 3-phase line RST at variable speed and reversible direction. To this end, the three-phase current is at first converted into direct current of constant voltage by means of a rectifier 7, such as a dry-rectifier set in three-phase connection. If the inverter is to be suitable also for the opposite power direction, then the rectifier 7 must be of a type that permits being also operated as a direct-to-alternating-current inverter, for instance a mercury arc rectifier wtih grid control. Each of the two stator windings I and II of the motor M is connected in the diagonal branch of a bridge network composed of the switching elements $S_1$ to $S_4$, or $S_5$ to $S_8$ and connected to the rectified voltage. Connected in series with the switching members are respective half-wave rectifiers 8 to 15, for instance, dry rectifiers. These rectifiers have the purpose of preventing the flow of current in the inverse direction through the respective switching members without requiring a reversing control of the switching members as such. For that reason, the switching members may consist not only of magnetic barrier members, but also of magnetically controllable semi-conductors of high carrier mobility, and also of transistors. If the switching members consist of magnetic barrier semi-conductors or high-vacuum tubes, then the additional half-wave rectifiers 8 to 15 may be omitted, provided the switching members are controlled to reverse their forward direction at the end of each half-wave.

Figure 8A:
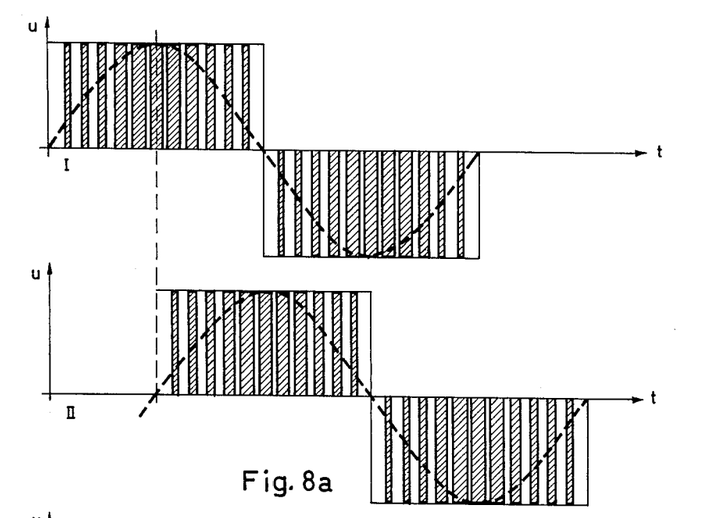
Figs. 8a, 8b and Figs. 9a, 9b represent further voltage curves explanatory of a system according to Fig. 7.
Figure 8B:
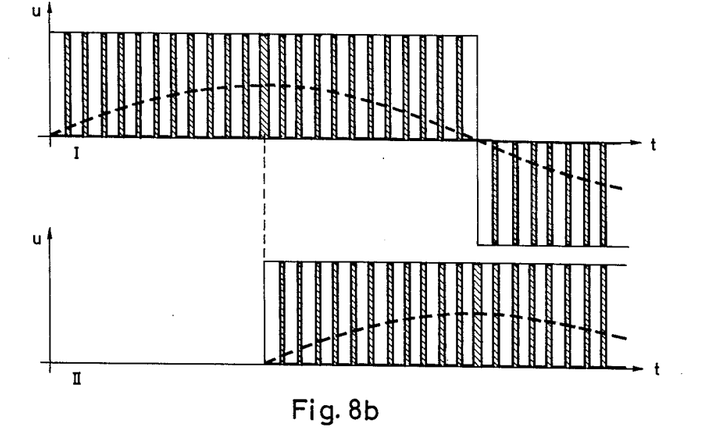

The operation of the apparatus will be explained with reference to Figs. 8a, 8b and 9a, 9b. These diagrams represent voltage $u$ versus time $t$. Fig. 8a relates to the voltage in the phase windings I and II for a relatively high fundamental frequency and a high output voltage. Fig. 8b relates to the voltage in windings I and II for low frequency and low voltage. As in the case of Fig. 3, the direct voltage is converted into alternating voltage of the desired frequency by chopping, varying ratio of make and break intervals, and reversing the polarity of the voltage after termination of each half-wave. For controlling the switching members to produce such curves, the control windings $W_{S1}$ to $W_{S4}$ for the phase I of motor M are connected in series, as shown in Fig. 7; and these windings are controlled by a device 4 which supplies control pulses in the rhythm apparent from Fig. 8a. For this purpose, a small middle-frequency generator 16 of any desired type may be used for furnishing the chopping frequency, a frequency changer 17 being connected in series with the generator. The frequency changer 17 supplies a voltage whose frequency corresponds to the desired speed of the rotating field and whose amplitude corresponds to the operating voltage to be impressed upon the motor M. Suitable as the frequency changer 17 is a conventional rotating frequency-converter machine with stator windings and a commutator with slip rings. This machine is shown driven by an auxiliary variable-speed motor $M^1$. The adjusted speed of the auxiliary motor $M^1$ determines the speed of the main motor M.

The control for the motor phase II has an analagous design and operation, except that a voltage of the same frequency as that of the frequency changer 17 is interposed between the terminals 19 in series relation to the middle-frequency generator 18, this interposed voltage being displaced one quarter period relative to the voltage of frequency changer 17. The auxiliary generator 18 may be formed by a second winding on the generator 16. The interposed voltage between the terminals 19 may be supplied from a second pair of brushes on the frequency changer 17, as illustrated.

It may be added that the switching members are preferably given a flip-flop characteristic so that, as already mentioned with reference to Fig. 2, the resistance is suddenly triggered from one to the other limit when the control magnitude passes through a given critical value. Since the sudden reduction in resistance is comparable to the ignition of a gaseous discharge device, the value of the control magnitude at which the resistance jumps to its minimum is hereinafter called the "ignition value." The ignition values for different feeder voltages then form a voltage characteristic, hereinafter called "ignition characteristic." In analogy, the characteristic indicating the values of control magnitude at which the resistance is triggered to its maximum, is hereinafter called the "extinction characteristic."

Figures 9A, 9B:
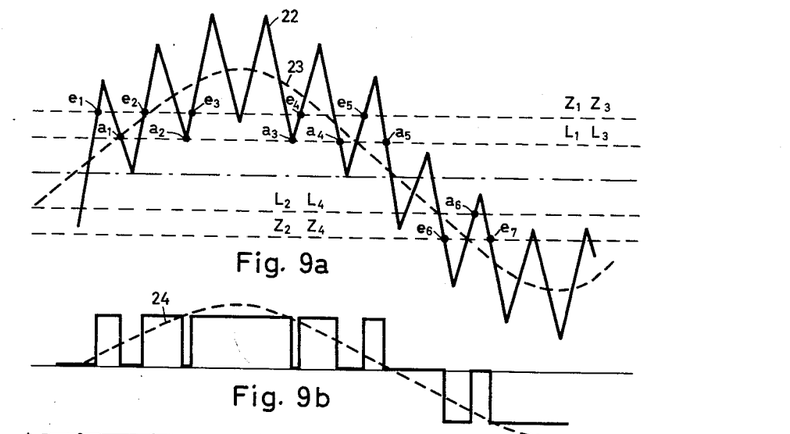

According to Fig. 9a, the make and break moments of the switching members in Fig. 7 occur at the points where the full-line curve 22 of the control current intersects the broken-line ignition characteristics $Z_1$ to $Z_4$ of the respective switching members $S_1$ to $S_4$, and at the intersections with the extinction characteristics $L_1$ to $L_4$. That is, at these points of intersection the switching members are triggered from low to high resistance of vice versa. The curve 22 of the control current results from the superposition of the low-frequency voltage curve 23 shown by a broken line and the preferably triangular voltage curve of the medium-frequency generator 6. Consequently a make pulse occurs at the intersection $e_1$ and a break pulse at the intersection $a_1$. The intermediate interval corresponds to the first current-conducting period (make period) according to Fig. 9b. The second, somewhat longer make period in Fig. 9b is determined by the intersection points $e_2$ and $a_2$ in Fig. 9a, and so forth.

The duration of the make periods, therefore, increases up to the maximum of the low-frequency control voltage 23 and thereafter decreases, so that a median value 24, shown by a broken line in Fig. 9b, will result. This voltage value 24 resembles the low-frequency voltage curve 23 in Fig. 9a, but in contrast to the relatively slight power in the control circuit, relates to the load circuit which carries the large power required for operating the drive motor M (Fig. 7). The ignition characteristics $Z_1$, $Z_3$ and $Z_2$, $Z_4$ preferably have a larger spacing from each other than corresponds to twice the amplitude of the triangular modulating voltage of generator 16. This results without further aid in having only one of the switching members $S_1$, $S_2$ or $S_3$, $S_4$ in conducting operation at a time.

The control for the motor phase II operates accordingly and supplies a 90° lagging voltage. Smoothing means are preferably provided for suppressing upper harmonics. The shunt capacitors 20 and 21 in Fig. 7 serve this purpose. The more rapidly the frequency changer 17 is driven, the smaller becomes the frequency taken off the commutator. At the synchronous revolving speed, corresponding to the frequency of the feeder line RST, the frequency changer 17 supplies direct current and the motor M receives direct voltage. Under these conditions, the broken-line curve 23 in Fig. 9 becomes a straight line located beneath the ignition characteristics $Z_1$, $Z_3$. Then the individual make periods are of equal duration and no current reversal can occur, so that practically, the motor phase I is energized by direct current. This applies braking torque until the motor is at standstill. A reversal of the running direction can be obtained by shifting one of the phases 180° or by reversing the control in one phase. Instead of a two-phase motor a normal three-phase motor may be used, it being only necessary to correspondingly enlarge the translating apparatus and its control devices in adaptation to the three-phase arrangement.

The described control system is also a typical example of a novel type of power-current amplification in which a controlling voltage or current of any wave shape is translated into a corresponding voltage or current within a circuit of much higher power capacity without incurring within the amplifier any power losses exceeding those of rotary converters and without the necessity of providing large energy-storing devices for the compensation of wattless power. The energy storing means still desirable for minimizing the upper harmonics of the superimposed auxiliary frequency have a very much smaller size than those required, for instance, with magnetic amplifiers or gaseous discharge rectifiers.

In the system according to Fig. 7, four controllable semiconductor members are required for each motor phase. In contrast, the modification shown in Fig. 10 operates with only two switching members for each motor phase. To make this possible, each motor phase is subdivided into two separate windings, only the circuit connection for the motor phase I being shown in Fig. 10 because the connection for the other motor phase II is the same. As apparent, each of the two windings Ia and Ib of the motor phase I can be traversed by current of only one given direction determined by the poling of the half-wave rectifiers 25 and 26. Consequently, the semiconductor members $S_1$ and $S_2$ must be controlled accordingly by the control magnet windings $W_{S1}$, $W_{S2}$. The control of the windings $W_{S1}$ and $W_{S2}$ can be effected by alternating current in the same manner as described with reference to the windings $W_{S1}$ and $W_{S2}$ in Fig. 7.

Figure 10:
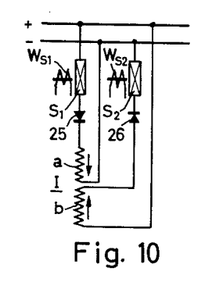
Fig. 10 shows the circuit diagram of a modified component for a system otherwise similar to that of Fig. 7.

Connecting a power-current switching member of the semiconductor type in series with a separate half-wave rectifier as shown in Figs. 7 and 10 permits using a relatively simple control device for the switching member. However, such a series connection of the semiconductor member with another valve is not necessary, if the semiconductor member is controlled to remain completely blocked during each second half-wave period of the low frequency.

Figure 11:
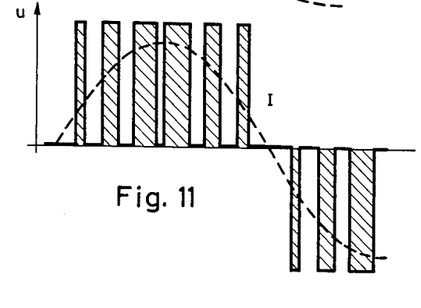
Fig. 11 is a voltage diagram explanatory of another modification in a system according to Fig. 7.

While in the embodiments last discussed the chopping frequency is constant and the width of the voltage sections is variable, the width of the voltage sections may be kept constant and instead the chopping frequency be varied. This amounts to varying the pauses or break intervals between the individual voltage sections as mentioned above with reference to Figs. 1c and 1d. A particularly simple design of the control device can be obtained, for instance, if a combined control method is used which varies the width of the voltage sections as well as the intermediate pauses, as is illustrated in Fig. 11. When applying this method by means of apparatus as shown in Fig. 7, then Fig. 11 takes the place of the diagram for the phase circuit I in Fig. 8a. An example of control means for securing such a combined control is illustrated in Fig. 12 with reference to the switching members $S_1$ to $S_4$ of Fig. 7.

Figure 12:
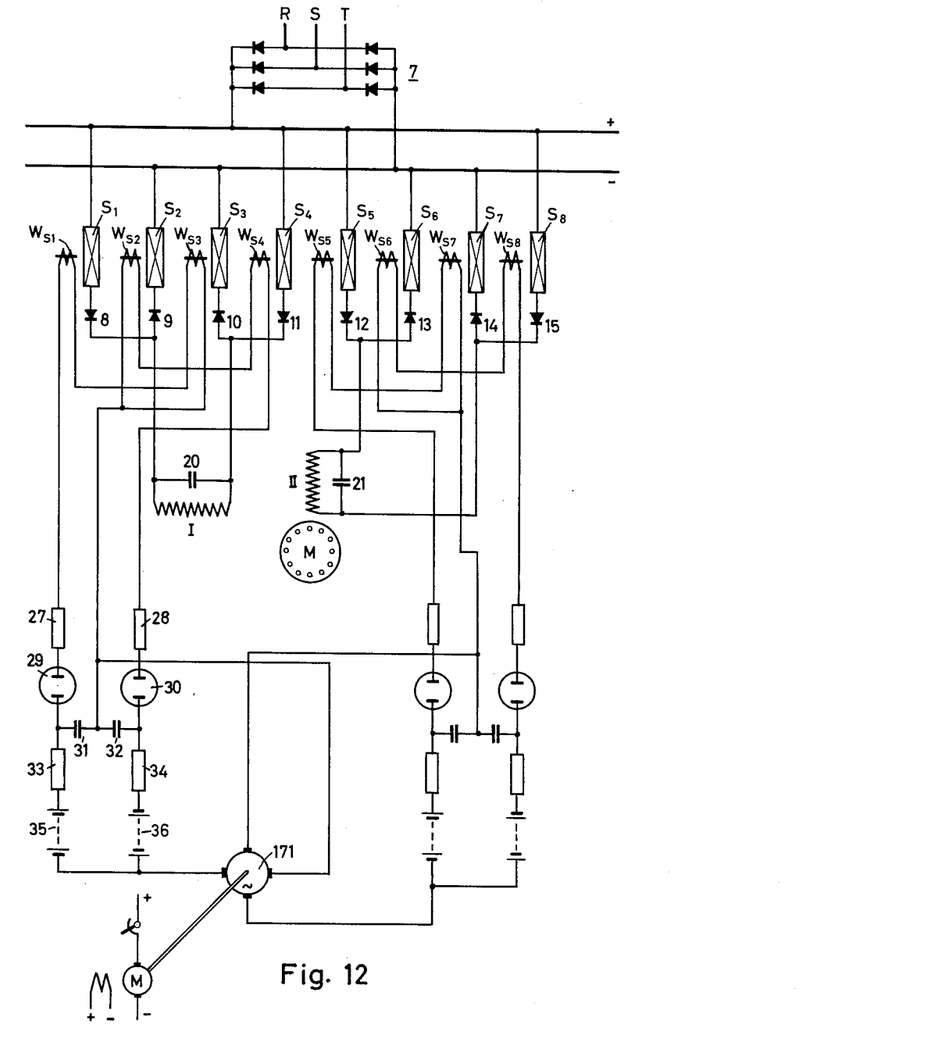
Fig. 12 shows the circuit diagram of a modified component for use in a system otherwise as shown in Fig. 7 and capable of performing the operation according to Fig. 11.

In Fig. 12 the control windings for the switching members $S_1$ to $S_4$ are denoted by $W_{S1}$, $W_{S3}$ and $W_{S2}$, $W_{S4}$. The control windings $W_{S1}$, $W_{S3}$ and $W_{S2}$, $W_{S4}$ are connected in series with respective glow discharge tubes 29, 30 across respective capacitors 31, 32. If desired, a resistor 27 or 28, as shown, may be connected in series with each pair of control windings. The two capacitors 31 and 32 are connected through respective resistors 33, 34 to respective direct-current sources 35, 36. The capacitors are further connected in series with a common source of controlling alternating voltage 171 which corresponds to the frequency changer 17 in Fig. 7. The voltage of the direct-current sources 35, 36 may correspond to about the ignition voltage of the glow tubes 29, 30. The capacitor 31 is charged above the ignition voltage when the voltage of the alternating current source 171 acts cumulatively to the voltage of the direct-current source 35. When the glow tube 29 is ignited, the capacitor 31 discharges through the control windings $W_{S1}$, $W_{S3}$, and the switching members $S_1$ and $S_3$ (Fig. 7) are controlled down to minimum resistance. The duration of the capacitor discharge depends upon how much charging current is replenished through the resistor 33. This, in turn, depends upon the magnitude of the voltage of the alternating-current source 171. When the voltage drops below the ignition voltage of the glow tube 29, then the control current drops to zero and the resistance of the switching members $S_1$, $S_3$ jumps up to the maximum value. The length of time elapsing till the next ignition of the glow tube 29 depends upon the magnitude of the voltage at the alternating current source 171. Consequently, the voltage simultaneously determines the duration of the pause and the width of the individual voltage sections. Since the voltage of the direct-current source 36 is in series with that of source 171 but is in opposed polarity relation to direct-current source 35, the ignition voltage at glow tube 30 is not reached during the particular voltage half-wave of the alternating current source 171 just considered. Hence the switching members $S_2$ and $S_4$ remain blocked. During the next following half-wave, the other circuit branch with control windings $W_{S2}$ and $W_{S4}$ comes into action, and the control windings $W_{S1}$ and $W_{S3}$ of the first-described circuit branch remain unexcited. It will be recognized that the control voltage for triggering the switching members is composed of the frequency-adjustable voltage from the dynamo-electric frequency changer 171 and the approximately triangular discharge voltage from the capacitor and glow-tube combination, both component voltages being superimposed upon each other. In this respect the system of Fig. 12 resembles that described above with reference to Figs. 7 and 9a.

Figure 13:
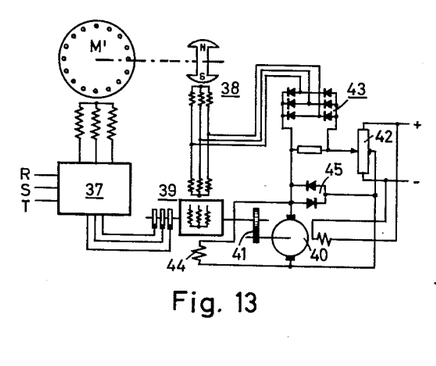
Fig. 13 is the circuit diagram of another system for controlling the speed of an induction motor by current of variable frequency supplied from a three-phase line.

The system of Fig. 7 as described above comprises an auxiliary frequency changer (17, 19) for supplying the control voltage of the converting apparatus. The magnitude and frequency of the control voltage are adjusted by varying the revolving speed of the auxiliary frequency changer with the aid of a variable-speed pilot motor $M^1$. Instead of an auxiliary frequency changer, however, the control voltage and the resulting speed control of the main motor may also be effected in accordance with the embodiment shown in Fig. 13 relating to the control and regulation of a three-phase induction motor M. Item 37 in Fig. 13 represents a translating apparatus comprising the rectifier 7, the switching members $S_1$ to $S_8$ and the auxiliary rectifiers 8 to 15 shown in Fig. 7. Only one phase of the motor control circuit is shown in Fig. 13, the two others being of analogous design, each being provided with a control voltage. The control voltage is formed by the voltages of a three-phase tachometer machine 38 coupled with the motor M. These voltages are supplied to a dynamo-electric, rotating-field converter 39 which increases the frequency of the tachometer 38 by a slip frequency $f_S$. This slip frequency $f_S$ is proportional to the revolving speed of the rotor in the motor-generator converter 39. The rotor revolving speed is determined by the speed of a small pilot motor 40 connected through a transmission gearing 41 with the converter 39. The speed of motor 40 is determined by the selected adjustment of a potentiometer 42 from which, depending upon the adjustment, a positive or negative direct voltage is tapped off. This direct voltage is compared with the voltage of the tachometer 38 rectified by a rectifier 43, and the difference voltage is impressed upon the armature of the pilot motor 40. Motor 40 is separately excited by the field winding 40'.

Figure 14:
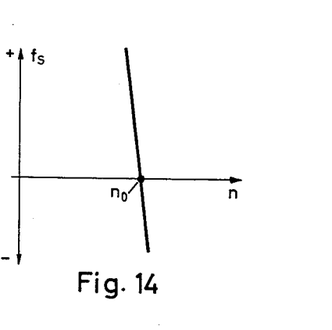
Fig. 14 is a coordinate diagram representing speed versus slip frequency and relates to the operation of a system according to Fig. 13.

The operation of the system is as follows: At standstill of the main motor M and with potentiometer 42 in the illustrated mid-position, no voltage is applied to pilot motor 40. The voltage of tachometer 38 is likewise zero. Consequently the translating device 37 does not receive control voltage and does not supply voltage to the main motor M. For starting the motor M, the tap of potentiometer 42 is displaced from the mid-position. This supplies voltage to the pilot motor 40. Simultaneously the frequency converter 39 receives excitation through an auxiliary excitation winding 44. The frequency converter then supplies at its sliprings a low frequency $f_S$, depending upon the speed of pilot motor 40 and the transmission ratio of gearing 41. The low frequency $f_S$ is translated by apparatus 37 into a three-phase voltage of the same frequency which causes the main motor M to start running. With increasing speed of motor M, the tachometer machine 38 supplies voltage to the converter 39, and the converter furnishes to the translating device 37 a control frequency increased by the slip frequency $f_S$. As a result, the main motor M accelerates with a torque proportional to the predetermined slip frequency $f_S$. The motor acceleration continues until the output voltage of the rectifier 43 equals the voltage pre-set at potentiometer 42. Then the pilot motor 40 stops, and the speed of the main motor M at no load is determined by the setting of the potentiometer 42. Under load, when an amount of slip must occur for overcoming the load torque, the speed of motor M is smaller by the amount of the load-responsive slip than the no-load speed $n_0$ to which the potentiometer 42 is set. The relation between motor speed and slip frequency is schematically shown in Fig. 14.

By changing the setting of potentiometer 42, any desired values of no-load speed $n_0$ can be adjusted within the available range. If during operation of the motor M the no-load speed $n_0$, decreases, a negative slip frequency will occur. That is, under these conditions the motor runs above synchronous speed and is subjected to braking. By displacing the potentiometer tap in the opposite direction from the mid-position, the motor is controlled to accelerate in the opposite direction. When the motor has reached a given speed, the auxiliary excitation of the rotary converter 39 supplied by the direct-current winding 44 is no longer required so that this winding can be disconnected.

The potentiometer tap can be displaced from the stop position immediately to the position that corresponds to the desired speed to be reached by the motor M, provided care is taken to have the feeding voltage of motor 40 limited to a given value so that its speed can likewise not exceed a given limit. This can be obtained by connecting a threshold resistor 45 parallel to the armature 40. The device 45 may consist, for instance, of two anti-parallel dry rectifiers as shown, or of any other voltage-dependent resistors, or of direct-voltage sources connected in series with a half-wave rectifier.

If instead of an induction motor M a synchronous motor is used, then a system largely similar to that of Fig. 13 may be employed for speed control, except that the rotary converter 39 is to be replaced by a rotary transformer and the pilot motor 40 is to be substituted by a comparing device, such as a weighing beam subjected to two mutually opposed torques of which one is proportional to the output voltage of rectifier 43 and the other proportional to the voltage tapped off the potentiometer 42. For starting the synchronous motor an auxiliary frequency of suitable voltage magnitude is preferably impressed upon the control windings of the translating apparatus 37.

Another way according to the invention of translating three-phase current of constant frequency and voltage into current of variable frequency and variable voltage resides in the method of cutting the sinusoidal voltage curves of the three-phases of the supply line by means of switching members into voltage sections which, in accordance with the instantaneous values of the sine wave, have different magnitudes and different polarities. These voltage-time areas or integrals are switched by the switching members onto the individual windings of the motor or other power consuming equipment so that a new voltage curve similar to a sinusoidal curve but of a different, preferably lower, frequency will result. The same voltage sections of the original frequency may also be applied to several circuits.

Figures 15A, 15B, 15C:
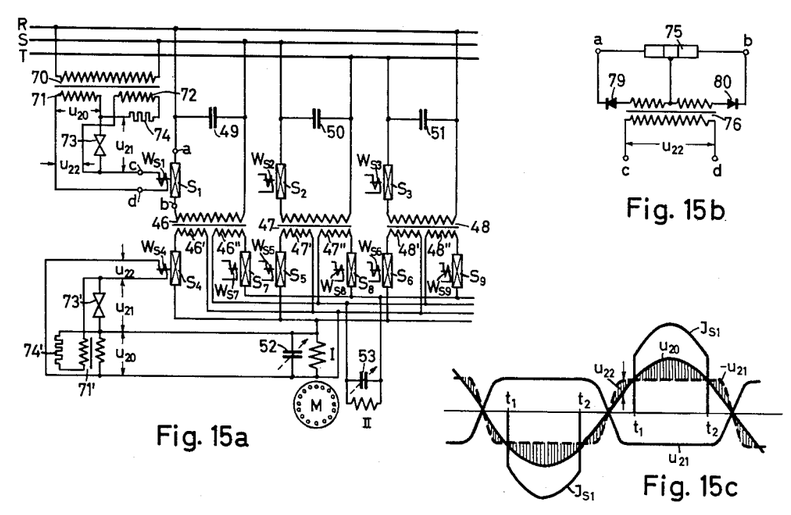

The control system of Fig. 15a embodies an example of such a system of energizing and controlling a two-phase squirrel-cage motor. According to Fig. 15a, three transformers 46, 47, 48, each having two secondary windings, are disposed between the input side and the output side of the system. These transformers permit isolating the circuits of the two motor phases I and II from each other so that a smaller number of circuit components is sufficient. The primary windings of the three transformers which, if desired, may be combined to a single three-phase transformer, are connected to the three-phase supply line RST in delta connection and in series with respective switching member $S_1$, $S_2$, $S_3$. For minimizing the effect of upper harmonics on the feeder line, suitably dimensioned capacitors 49, 50 and 51 may be connected in parallel to the individual transformer circuits, as illustrated. The left-hand secondary windings 46' to 48' are connected through respective switching members $S_3$, $S_5$, $S_6$ to the motor phase winding I, and the right-hand secondary windings 46'' to 48'' through respective switching members $S_7$, $S_8$, $S_9$ to the motor phase winding II. As in the embodiment of Fig. 7, each motor phase winding may be shunted by a capacitor 52 or 53.

The system of Fig. 15a is provided with another transformer 70 whose primary winding is connected to the same phase leads R, S to which the transformer 46 is connected. Transformer 70 has two secondary windings 71 and 72. Secondary winding 71 energizes the control winding $W_{S1}$ of switching member $S_1$ through a voltage-responsive resistor 73 by sinusoidal voltage represented in Fig. 15c by wave $u_{20}$. The other secondary winding 72 is connected across the voltage-responsive resistor 73 through an ohmic resistor 74. As a result, the resistor 73 is impressed by a voltage $u_{21}$ which is not sinusoidal but is flattened to an approximately trapezoidal wave shape. This voltage is taken from the winding 72 with such a polarity that it is oppositely directed relative to the sinusoidal voltage $u_{20}$. The sum of the two voltages $u_{20}$ and $u_{21}$ acts upon the control winding $W_{S1}$. This sum voltage is shown in Fig. 15c as the difference between the voltage $u_{20}$ and the negatively entered voltage $-u_{21}$. It will be recognized in Fig. 15c that the switching member $S_1$ is opened at the moment $t_1$ and is again closed at the moment $t_2$. This also applies to the negative half-waves of the line voltage, provided the switching member $S_1$ is of the magnetic barrier type so that it reverses its blocking direction together with the polarity reversal of the magnetic field while the polarity of the applied voltage remains the same or, analogously, the blocking direction reverses together with the applied voltage while the magnetic-field polarity remains the same.

The same type of control may also be applied to a transistor whose emitter and collector alternately exchange their operations and in which the voltage $u_{22}$ determines the potential of the transistor base contact relative to the one control electrode operating as the emitter at a time. The modified circuit diagram illustrated in Fig. 15b shows a connection suitable for such an operation of a junction-type transistor 75. The voltage $u_{22}$ is applied through a transformer 76 to the control electrodes so that the desired control effect is obtained when the voltage across the terminals $a$ and $b$ changes its polarity. Two valves 79 and 80 are provided for the prevention of disturbing currents in the control circuit. In Figs. 15a and 15b the respective corresponding terminal points are denoted by $a$ to $d$. That is, the components shown in Fig. 15b between the terminals $a$ to $d$ are to be inserted into a system according to Fig. 15a instead of the components $S_1$ and $W_{S1}$.

In Fig. 15a the control of the switching members $S_4$ to $S_9$ is illustrated only for the switching member $S_4$. The control principle corresponds to that applied to the switching member $S_1$, except that the alternating control voltage is not taken from the line but is supplied from the voltage effective at the field winding I of motor M. Accordingly, the voltages $u_{20}$, $u_{21}$ and $u_{22}$ have different frequency. The control or regulation of the motor speed is effected by varying the capacitance of the capacitor 52 connected parallel to the motor winding I.

Analogously designed and operative control means are applicable for the control of the switching members $S_2$ and $S_3$. The individual control means for members $S_2$ and $S_3$ correspond to those described above with reference to the switching member $S_1$ except that the control means for the switching member $S_2$ have their transformer 70 connected across the phase leads S and T, and the corresponding transformer for the control of switching member $S_3$ is connected to the phase leads T and R. Similarly, the control means for the switching members $S_5$ to $S_9$ are designed and operative in the same manner as the control means for the switching member $S_4$ described in the foregoing, except that the transformer 71' for the control of switching members $S_7$, $S_8$, $S_9$ is connected to the winding II of the motor M, while the corresponding transformer for switching members $S_5$ and $S_6$ is connected to the motor winding I corresponding to the connection shown for switching member $S_4$. When changing the motor speed by varying the capacitance setting of capacitor 52 the capacitance of capacitor 53 must likewise be given a correspondingly different setting. The operation of the system Fig. 15a will be further explained with reference to Fig. 16.

Figure 16:
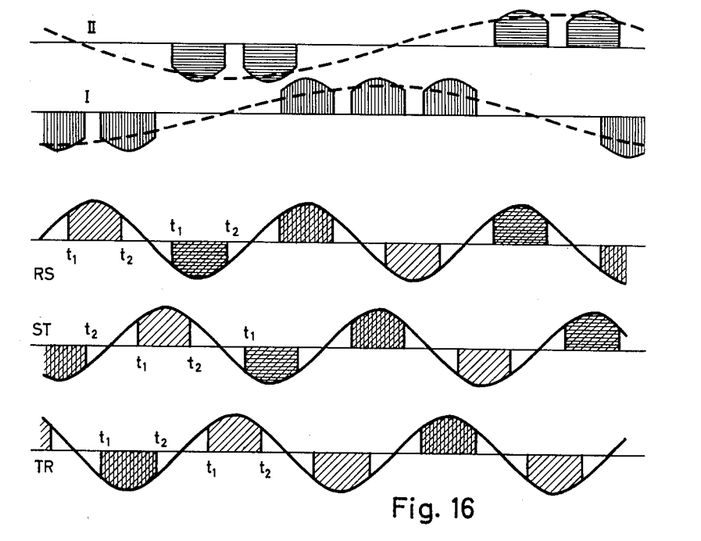
Fig. 16 shows explanatory voltage-time diagrams relating to the operation of the system according to Fig. 15.

Fig. 16 shows, one below the other, the sine waves of the three-phase voltages RS, ST and TR which are displaced 120° electrical relative to each other. By proper control of the switching member $S_1$ with the above-described means, the switching member opens its circuit and commences to conduct current during each half-wave period at the make moment $t_1$. At the moment $t_2$ the switching member closes its circuit so that a voltage section is cut out of each half-wave. By displacing the make and break moments $t_1$ and $t_2$ in mutually opposite sense, the part-time conductance interval during each half-wave can be decreased and increased. The same control occurs with the semiconductor switching members $S_2$ and $S_3$ with the proper phase displacement of 120° electrical. Consequently, between the moments $t_1$ and $t_2$ the secondary windings 46' to 48' and 46" to 48" produce a voltage as represented by each diagonally hatched area. In the three phases RS, ST and TR, individual ones of these hatched voltage areas, i.e. voltage time integrals, can be selected and can be assigned to the motor phase I and to the motor phase II so that they form a median voltage curve in accordance with the desired frequency. For instance, in Fig. 16 the vertically hatched sections of the three phases RS, ST and TR form for the phase I of the motor a new voltage wave whose fundamental frequency is shown by a broken line. The fundamental frequency for the motor phase II is formed by the horizontally hatched voltage sections of the three supply phases RS, ST and TR. The base frequency for this phase II is the same as for the phase I but is displaced 90° relative thereto.

As apparent from the composition of the two motor phases I and II in Fig. 16, the fundamental waves of the two phases in the example under consideration do not have equal magnitudes because each individual half-wave of phase I comprises three voltage sections while the voltage of phase II is composed of only two sections. However, this is not unduly detrimental for the operation of a squirrel-cage motor in a drive system according to Fig. 15a because the torque of such a motor decreases relatively little when the individual phases are energized symmetrically. Furthermore, the control performance according to Fig. 16 is presented only for explaining the principle of operation. By a different subdivision of the individual half-waves in the three phases RS, ST and TR into several voltage sections and by a different selection of these sections, a symmetrical two-phase or multi-phase system can also be obtained.

The invention, therefore, makes it possible to cut individual voltage sections out of the voltage supplied from a multi-phase line and to compose these sections into new voltages, wave shapes and frequencies in single or multi-phase systems, while using for this purpose completely static circuit components, namely controllable semi-conductor devices, and providing two or more series-connected switching members which are periodically controlled according to a predetermined program and independently of each other.

Figure 17:
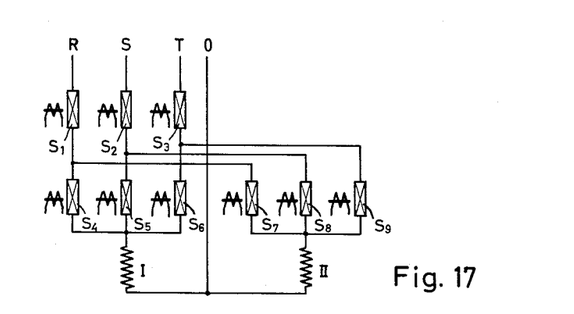
Fig. 17 illustrates the schematic circuit diagram of a modified frequency and voltage changer suitable for operations similar to those performed by the system of Fig. 15.

The translating system illustrated in Fig. 17 permits realizing the same translating principle as explained with reference to Figs. 15a to 16. The switching members $S_1$ to $S_3$ operate to cut individual sections out of the phase voltages R, S and T. That is these switching members make and break their circuit several times during each half-wave period. The switching members $S_2$ to $S_6$ on the one hand and $S_7$ to $S_9$ on the other hand select individual voltage sections and compose the selected sections into new voltage curves for the motor phases I and II. Contrary to the system of Fig. 15a, the embodiment of Fig. 17 does not require intermediate power transformers. The control devices for the switching members in Fig. 17 may be similar to those shown in Fig. 15a and described above.

Figure 18A:
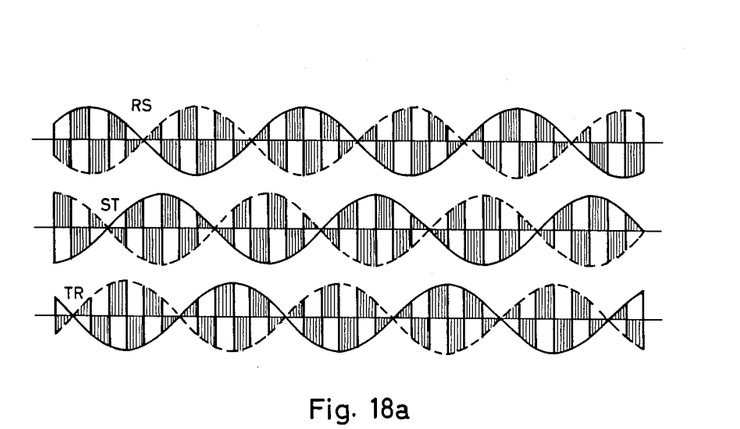
Figs. 18a and 18b shows voltage diagrams explanatory of another way of changing frequency.
Figure 18B:
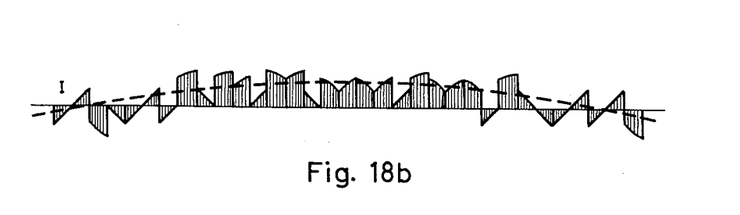

A change in frequency can also be effected by repeatedly chopping the individual half-waves of the alternating supply voltage and giving individual voltage sections, for instance each following section, respectively different polarities so as to produce voltage curves as shown in Fig. 18a for the three phases RS, ST and TR of 120° mutual phase displacement. This affords a particularly large variety of possibilities to compose new alternating voltage curves from the individual positive and negative voltage sections. For instance, a fundamental frequency may be composed in the manner shown in Fig. 18b for the phase I of a squirrel-cage motor, the new voltage curve being shown by a broken line. The new voltage, as illustrated, is composed of individual positive and negative sections of the original phase voltages RS, ST and TR. For the motor phase II a fundamental frequency of 90° displacement can be composed in a similar manner.

Figure 19:
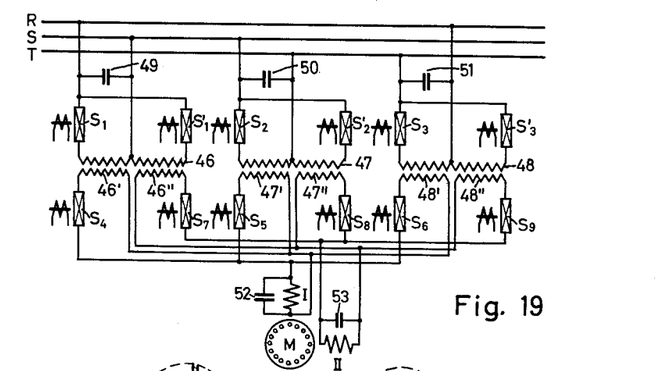
Fig. 19 is a schematic circuit diagram of a motor control system operating in accordance with Figs. 18a and 18b, and Figs. 20, 21 and 22 are explanatory voltage-time diagrams relating to voltage control by variable part-time conductance.

The system illustrated in Fig. 19 performs such a frequency changing operation. The exemplified purpose of the system is again the operation of a two-phase squirrel-cage motor from a three-phase feeder line RST. The secondary side of the system is the same as in Fig. 15a, the same reference being applied to corresponding components in both figures. The primary side of the system in Fig. 19 is similar to that described with reference to Fig. 4 in that a reversal in polarity of the voltage at the transformer primaries 46 to 48 is provided for by a push-pull connection, namely, by giving the primaries a mid-tap and energizing one of the half portions of each primary through a second switching member S', S'$_2$ or S'$_3$.

Figure 20:
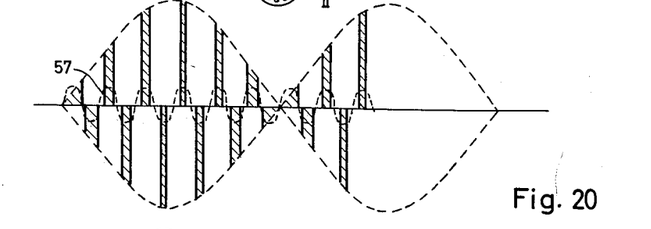

It is further possible to reverse the resistance control of the switching members so rapidly and in such a timely sequence that the chopping of the individual half-waves of an alternating voltage results in a constant median value of the individual voltage pulses. As a result, and as illustrated in Fig. 20, an alternating voltage of higher frequency and approximately constant amplitude of its fundamental wave is obtained according to the broken line 57, provided care is taken to have the make intervals decrease toward the middle of each half-wave period and increase during the second portion of that period while reversing the polarity of the individual successive voltage impulses. The upper harmonics then occurring can be suppressed by filter means as described previously.

Figure 21:
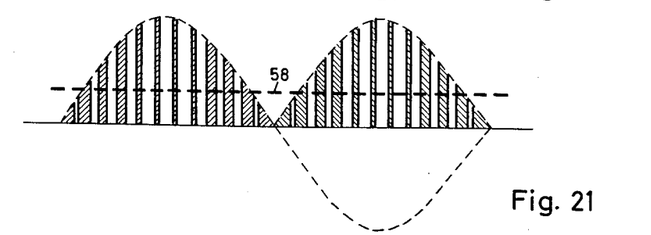

An alternating voltage may further be translated into a direct voltage of approximately constant median value. To this end and as illustrated in Fig. 21, the individual half-waves of the alternating voltage are chopped into voltage sections in the same manner as explained with reference to Fig. 20 without reversing the polarity of the successive sections within the same half-wave, provided all voltage sections of each alternate half-wave are reversed in polarity for instance by means of a bridge network. The filter components for smoothing the output voltage are then considerably smaller than required for the conventional rectification of an alternating feeder voltage of the same frequency. This is of advantage for such applications where the filter means for smoothing the direct current resulting from conventional rectification would cause time-delays detrimental to the operation of the motor being energized. This is the case, for instance, with highly sensitive regulating devices in which the measuring value to be responded to is available as an alternating voltage which must be rectified before being applied to the regulating circuits proper.

If the feeder current used for a translating operation according to Fig. 20 is single-phase alternating, then the median value of the output voltage of higher frequency is relatively low in comparison with the amplitude of the original alternating voltage. However, the amplitudes of the new-frequency voltage are considerably larger when the same method is applied to three-phase feeder current and if care is taken, by timely commutating from each phase to the next following phase, to utilize only the peak portions of the sine wave of the fundamental-frequency voltages. It is then relatively simple to obtain for the resulting median frequency a constant amplitude because relatively slight changes in the make periods are sufficient.

Figure 22:
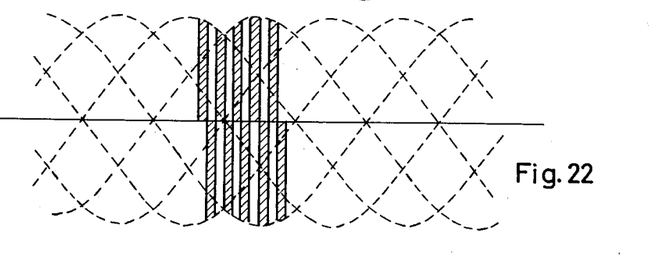

If, for instance, with a method according to Fig. 22, another voltage of the same median frequency is produced and if the two voltages are imposed upon each other, then the amplitude of the resultant output voltage can be varied simply by varying the phase displacement between the two superimposed voltages. By continuously varying the phase voltage, this method can also be used for subjecting the amplitudes of the sum voltage to modulation with a new frequency. By rectifying the sum voltage and changing the polarity of rectification at the voltage zero passages, a new low frequency is obtained which can be regulated in a simple manner. A similar result is obtained by giving the two superimposed voltages somewhat different frequencies. The sum is a beat-frequency voltage whose rectification also results in furnishing a new lower frequency. It is possible therefore, in this manner to vary a lower output frequency within a wide range simply by phase displacing a high frequency.

The above-described method for the conversion of alternating current may be applied for equalizing load peaks in distribution systems with the aid of a flywheel generator. The flywheel is driven from a motor, such as a wound rotor motor or a synchronous motor, and one of the above-described frequency changers is interposed between the driving motor and the power distribution line of the frequency $f_1$ whose load peaks are to be equalized. The frequency changer is capable of continuously converting the frequency of the line to a somewhat higher and/or somewhat lower value $f_2$ and, if desired, to also vary the voltage amplitude accordingly. For equalizing a load peak in the distribution line, the frequency value $f_2$ is lowered by gradually varying the frequency ratio so that the flywheel runs at supersynchronous speed and supplies power. In the load valleys the frequency $f_2$ is increased so that the flywheel consumes power. This control of the frequency changer can be effected in dependence upon the load of the line or upon the current or power consumption of consuming equipment. Such a system is advantageous, for instance, for the operation of reversible rolling mills, or mine hoists and other hoisting equipment which usually involves large load peaks.

In control systems as described above, it is important for securing low losses that during the chopping operation the transition from minimum to maximum current and vice versa occurs with a minimum of losses in the switching member. To this end, the time interval during which the change in resistance occurs can be shortened. On the other hand, the same purpose can be served by subjecting the current characteristic resulting from the resistance change to modification so that the current increase during make operation is delayed and the current decline during break operation is accelerated. Such means for reducing the transitory losses are more fully disclosed in the copending application Serial No. 491,983, filed March 3, 1955, and assigned to the assignee of the present invention.

While in the foregoing we have described semiconductor devices as voltage-chopping components of translating apparatus according to the invention, it is for some applications also possible to use high-vacuum tubes instead of the semiconductors, although such tubes are less rugged and have a high residual resistance when conducting. For instance, such tubes may be used as switching members $S_1$ to $S_8$ in such systems as shown in Fig. 7 and following. In that case, when applying high-vacuum tubes for power translation, flip-flop phenomena are less significant and need not be used. The control range of the tubes then takes the place of the trigger characteristics Z and L in Fig. 9a. That is, the characteristics Z and L then represent the limits of the grid voltages for maximum conductance and blocking of the tubes, respectively. In Fig. 9b the frontal steepness of the voltage sections, which is essential for the resulting losses, increases and hence becomes more favorable with a smaller control range of the tubes.

It will be apparent to those skilled in the art, upon a study of this disclosure, that our invention permits of various modifications and applications other than those specifically set forth herein, without departing from the essential features of our invention and within the scope of the claims annexed hereto.

We claim:

1. A motor control system, comprising voltage supply means, a rotating-field motor, static switching means having a semiconductor member of controllable resistance connecting said motor with said voltage supply means and having periodic resistance control means joined with said semiconductor member for triggering said resistance between minimum and maximum to periodically chop said supply voltage into individual voltage sections to impress alternating output voltage upon said motor, said control means having a controllable source of variable-frequency voltage for controlling the frequency of said output voltage to thereby control the speed of said motor, said source of variable-frequency voltage comprising a dynamoelectric frequency changer having a voltage variable in approximately linear proportion to its frequency, and said control means comprising another source of approximately triangular voltage corresponding to a desired chopping frequency higher than that frequency of said frequency changer, and circuit means connecting said frequency-changer voltage and said triangular voltage superimposed upon other to said static switching means.

2. In a motor control system according to claim 1, said other source of substantially triangular voltage comprising a capacitor, a charging circuit connected with said capacitor, a glow discharge tube connecting said capacitor with said switching device, and resistance means connected with said capacitor for controlling the capacitor charging voltage to thereby determine the make period and frequency of the chopping operation of said switching device.

3. A motor control system, comprising voltage supply means, an alternating-current motor, a static switching device of controllable resistance having a semiconductor member connected to said supply means in series with said motor and having a magnetic field in whose field said semiconductor member is disposed, said field member having a magnetizing winding for controlling the resistance of said semiconductor member, a source of periodic current connected to said field winding for controlling said device to chop said voltage into individual voltage sections, and adjustable frequency-control means connected with said source for varying the make and break intervals of said switching device to adjust the median values of said voltage sections in accordance with the adjusted frequency, whereby the speed of said motor is controllable by varying the adjustment of said frequency control means.

4. A motor control system, comprising voltage supply means, a squirrel-cage motor having a field winding, a static switching device having a semiconductor member of variable resistance connecting said supply means with said field winding, said device having periodic resistance control means connected with said semiconductor member for controlling said resistance of said member to chop said supply voltage into individual sections, and a controllable source of variable-frequency voltage for varying the frequency of said control means to thereby control the speed of said motor.

5. A motor control system, comprising voltage supply means having two buses, an alternating current motor having two terminals, a static switching device connecting said motor terminals to said buses, said device having two pairs of symmetrically conducting semiconductor members of controllable resistance, each pair having its two members connected between one of said respective terminals and said respective two buses, two half-wave rectifiers series-connected with said respective members of each pair in mutually opposed poling relative to said motor, said device having four magnetic field means in whose respective fields said four semiconductor members are located, and periodic-current supply means connected to said field means for causing them to trigger the resistance of said semiconductor members between maximum and minimum to periodically chop the supply voltage into individual voltage sections whereby said motor terminals are impressed by alternating voltage, said periodic current supply means having frequency-adjusting means for varying the frequency of said alternating voltage to thereby control the motor speed.

6. A motor control system, comprising voltage supply means, a plural-phase alternating-current motor having a field winding for each of its respective phases, a plurality of static switching devices for said respective phases, each of said switching devices connecting one of said respective windings to said supply means and having a semiconductor member of controllable resistance and periodic resistance control means for triggering said resistance between minimum and maximum to periodically chop said supply voltage into individual voltage sections to impress alternating voltage upon said respective windings, said control means having a frequency-controllable source of mutually phase-displaced voltages connected with said respective switching devices, whereby the speed of said motor is controlled by change in frequency of said source.

References Cited in the file of this patent

UNITED STATES PATENTS

| | | |
|---|---|---|
| 1,408,758 | Meyer | Mar. 7, 1922 |
| 2,719,944 | Brailsford | Oct. 4, 1955 |
| 2,784,365 | Fenemore et al. | Mar. 5, 1957 |